June 14, 1960  C. C. MITCHELL  2,940,335
COUNTERBALANCE CONTROL FOR PUMPING UNITS
Filed Oct. 22, 1957

CURTIS C. MITCHELL
INVENTOR.

BY *Herbert J. Brown*
ATTORNEY

United States Patent Office 2,940,335
Patented June 14, 1960

2,940,335

COUNTERBALANCE CONTROL FOR PUMPING UNITS

Curtis C. Mitchell, Fort Worth, Tex., assignor to American Manufacturing Company of Texas, Fort Worth, Tex., a corporation of Texas Filed Oct. 22, 1957, Ser. No. 691,639

1 Claim. (Cl. 74—589)

This invention relates to oil field equipment and more particularly to a class of equipment known as counterbalanced pumping units.

The primary object of this invention is to provide accurate means for adjusting the total counterbalance effect on a reciprocating pump.

Another object is to provide a more rapid means for counterbalancing an oil field pumping unit than is presently available.

An additional object is to provide means for adjusting the balance on a movable unit while the unit is in motion.

Another object is to provide an electrically operated physical means for adjusting the balance of a reciprocating unit wherein additional means are provided to electrically determine the accuracy of the physical balance while the adjustment is taking place.

And yet another object is to provide a laterally adjustable counterweight which is directly moved in either direction by the selective rotation of a relatively long screw shaft which is powered and controlled by an electric motor mounted in axial alignment therewith.

A still further object is to provide a means for determining the degree of balance of an electric motor operated power device which includes placing an ammeter in circuit with the motor so that unbalances in the current demand by the electric motor will be instantly visible and will reflect the dynamic balance of the machinery being operated by the motor.

And another object is to provide a relatively heavy counterweight which is adapted to be adjustably installed along the top side of the walking beam of an oil well pumping unit to obtain the optimum of balance in the operating machinery and in which installation the counterweight itself slidably engages the beam so that no additional structure is required for this purpose.

These and other objects and advantages will be apparent from an examination of the following specification and drawings in which.

Figure 1:
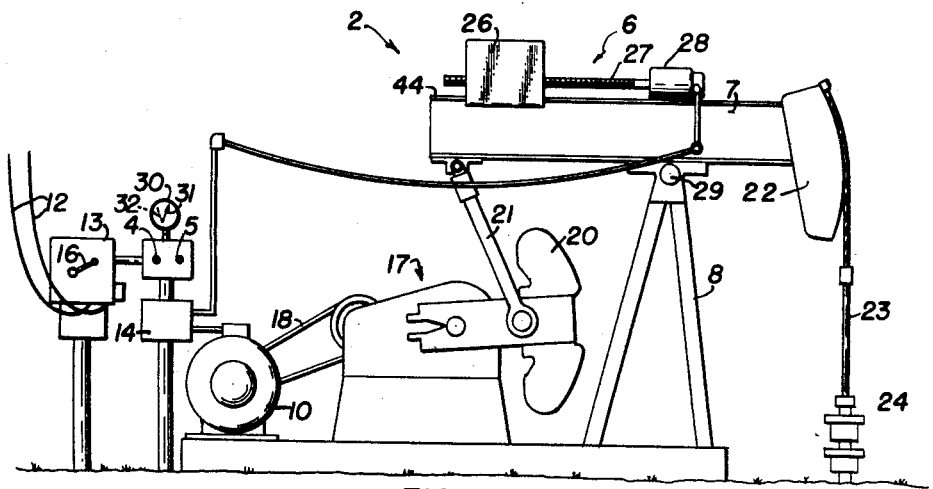
Figure 1 represents a side elevational outline view of an oil well pumping unit showing the installation of the counterbalance means of this invention.

Referring now more particularly to the characters of reference in the drawing it will be observed that the complete assembly of the adjustable counterbalance system, indicated generally at 2, includes an electrical circuit 3 (see Figure 2) having selector switches 4 and 5 for adjusting the counterbalance unit 6 which is mounted on the top side of the walking beam 7 of an oil well pumping unit 8.

Figure 2:
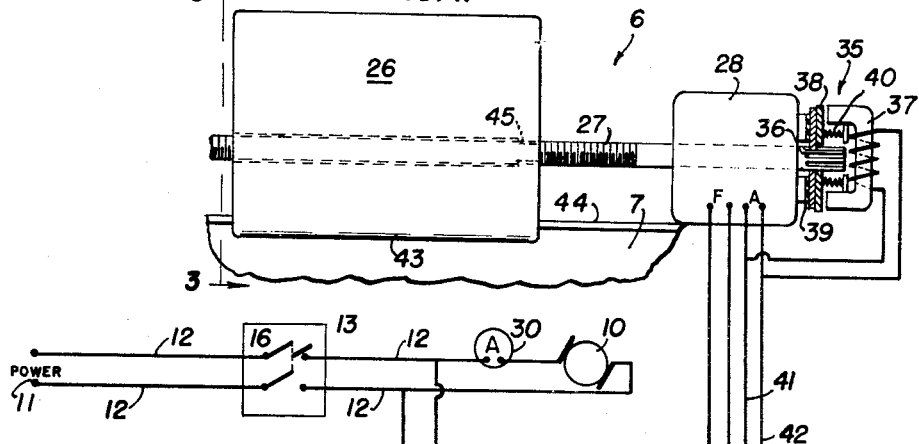
Figure 2 is a circuit diagram partly in schematic of the unique adjustable counterbalance system of Figure 1.
Figure 3:
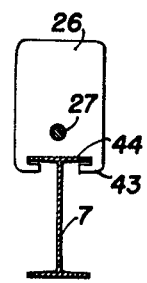
Figure 3 is a cross sectional view taken along the lines 3—3 of Figure 2.

The electrical circuit 3 is interposed in the regular electrical system required to operate the pump's electric drive motor 10; which system includes a suitable power supply source 11, indicated in Figure 2, and includes a lead 12 from the source 11 through a conventional switch box 13 and relay (not shown) to the motor 10. A start-stop switch 16 is included to permit the operator to control the operation of the motor 10 and consequently the drive unit 17 by means of a conventional belt arrangement 18 which, through gears (not shown), supplies power to counterbalance crank 20. The pitman 21 converts the rotary movement of crank 20 into reciprocating movement of the walking beam 7 to which it is pivotally connected near one end. Conventionally the other end of the walking beam 7 includes a relatively large mule head 22 to which the polish rod 23 is flexible connected to operate a string of sucker rods and a fluid pump at a depth in the oil well after passing through the well head 24.

In the operation of pumping unit 8, when the polish rod 23 is being moved downward the mule head 22 is assisting the drive unit 17 in balancing this downward stroke, but on the upward stroke the weight of the oil being pumped must be lifted. The formation conditions affect the total lifting or lowering forces required and since these conditions are subject to change, for example, change in bottom hole pressure, it is impractical to set up a counterbalance system having a fixed value. Some pumping unit manufacturers have made provisions whereby the conventional counterweights may be shifted manually, and other provisions whereby separate additional weights may be added or removed from the pumping unit at the well site in an attempt to obtain an overall balanced system which is recognized as important to the performance, the work load, and the ultimate life of the equipment. However, in addition to it being a time-consuming manual operation which requires that the pumping unit be temporarily shut down, the manual adjustment of weights is inaccurate and is not subject to a visual measurement.

In order to overcome these difficulties and to provide an accurate, rapid and visual indication of any unbalanced condition, and to provide an equally rapid and accurate means of correcting this condition, an auxiliary counterweight 26 is slidably installed on beam 7 and in movable relation with screw shaft 27 which is reversably powered by electric motor 28 to selectively locate counterweight 26 at the proper location from the main pivot 29 of the pumping unit 8.

Since the electrical drain from power source 11 through lead 12 is directly dependent upon the electrical load of the pumping unit drive motor 10, and since this electrical load is proportional to the physical balance of the system, it will be seen that if the balance were correct, the needle 31 of the ammeter 30, connected in series in one lead 12, will alternately and uniformly vary between two increments during the down and up strokes. On the other hand, if the system is out of balance the ammeter needle will erratically fluctuate, thus indicating the peaks on the down and up strokes are uneven. When the movement of the needle, as indicated at 32, is erratic, the operator knows the system is out of balance and he may then press one of the push button switches 4 to rotate the screw shaft 27 in one direction to move counterweight 26, for example, inward toward pivot 29 to correct the unbalanced condition. If this movement is in the proper direction to correct the unbalance, the movement of the needle 31 will tend to become uniform, after which the button operation is repeated until the best condition of balance is attained. In the event the movement of counterweight 26 is in the wrong direction, the swing of needle 31 will immediately become more erratic, and the other switch 5 is then pressed to cause a reverse rotation of motor 28 and its screw shaft 27. In order to prevent any unintentional movement of shaft 27 and consequently a required relocating of the auxiliary counterweight 26, there has been installed an electrically released, spring engaged, disk type brake 35 on the extension 36 of the motor shaft 27 which projects beyond the motor 28 on the side opposite the counterweight 26. The brake 35 includes an electromagnet 37 which exerts an attraction force on a sliding but non-rotating disk 38 to pull it away from the rotating disk 39 and against the pressure of springs 40. When there is no current in either lead 41 or 42, the pressure of springs 40 is sufficient to press the disk 38 against the disk 39 with a braking force and thus prevent any rotation of shaft 27. However, when there is a current in either lead 41 or 42 the electromagnet 37 is energized and the brake is released.

The auxiliary counterweight 26 may be either a machined or a cast block which has a pair of inward extending lugs 43 which define a horizontally extending recess 44. By sliding the counterweight recess 44 into engagement with the top edge of beam 7, a horizontally sliding but retained engagement is obtained so that the counterweight 26 is free to be moved in an inward or an outward direction by forward or a reverse rotation of shaft 27 acting against the internal threads 45, but will remain stationary under all other conditions.

The invention is not limited to the exemplary construction herein shown and described, but may be made in various ways within the scope of the appended claim.

What is claimed is:

In a pumping unit having a walking beam pivotally supported intermediate its ends and having a sucker rod connected at one end thereof, said pumping unit including an electric drive motor having supply leads and means connecting said drive motor with said walking beam imparting a reciprocating movement to the latter, a counterweight mounted for longitudinal movement on said walking beam for balancing loads on said sucker rod, a reversible electric motor mounted on said walking beam, a screw shaft substantially parallel with said walking beam and threadedly engaging said counterweight, means rotatably connecting said screw shaft with said reversible motor, normally open manually operated reversible switch means electrically connected with said reversible motor to adjust said counterweight, an ammeter connected in series with one of said leads to said electric drive motor to deflect variations in loads on said sucker rod, and means supplying current to said reversible motor through said normally open manually operated reversing switch means.

References Cited in the file of this patent

UNITED STATES PATENTS

| | | |
|---|---|---|
| 1,706,407 | Miller et al. | Mar. 26, 1929 |
| 1,795,922 | Baker | Mar. 10, 1931 |
| 1,908,653 | Andrews | May 9, 1933 |
| 2,184,200 | Thomas | Dec. 19, 1939 |
| 2,432,735 | Downing | Dec. 16, 1947 |
| 2,482,568 | Werner | Sept. 20, 1949 |
| 2,526,561 | Keltner | Oct. 17, 1950 |
| 2,726,490 | Lowe | Dec. 13, 1955 |
| 2,808,735 | Becker | Oct. 8, 1957 |